(12) United States Patent
Sdobnikov

(10) Patent No.: US 11,615,599 B2
(45) Date of Patent: Mar. 28, 2023

(54) APPARATUS OF SHAKING COMPENSATION AND METHOD OF SHAKING COMPENSATION

(71) Applicant: Harman International Industries, Incorporated, Stamford, CT (US)

(72) Inventor: Viktor Yuriyovych Sdobnikov, Kyiv (UA)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/529,532

(22) Filed: Nov. 18, 2021

(65) Prior Publication Data

US 2022/0076498 A1 Mar. 10, 2022

Related U.S. Application Data

(63) Continuation-in-part of application No. 17/268,786, filed as application No. PCT/UA2019/000171 on Dec. 28, 2019, now abandoned.

(30) Foreign Application Priority Data

Mar. 15, 2019 (UA) .............................. a 2019 02561

(51) Int. Cl.
*G06T 19/00* (2011.01)
*G06T 7/277* (2017.01)
(Continued)

(52) U.S. Cl.
CPC ............ *G06T 19/006* (2013.01); *B62D 15/02* (2013.01); *G06T 7/277* (2017.01); *G06V 20/56* (2022.01);
(Continued)

(58) Field of Classification Search
CPC ............ H04N 5/23267; B60K 2370/52; B60K 2370/177; B60K 2370/193; G02B 27/0179; G02B 2027/0183
See application file for complete search history.

(56) References Cited

U.S. PATENT DOCUMENTS 6,982,746 B1 1/2006 Kawahara
10,642,034 B2 * 5/2020 Oshima ..................... G06T 3/20
(Continued)

FOREIGN PATENT DOCUMENTS

JP H01293239 A * 11/1989
JP 2017-13590 A 1/2017
(Continued)

*Primary Examiner* — John Villecco
(74) *Attorney, Agent, or Firm* — Artegis Law Group, LLP

(57) ABSTRACT

The invention can be used to compensate shaking in relation to augmented reality systems on a vehicle projection display. The apparatus comprises the recognition front facing camera, gyro sensor and accelerometer, and vehicle sensors, connected with a prediction module, the gyro sensor, accelerometer and vehicle sensors are also connected with the positioning module, the gyro sensor and accelerometer are also connected with the shaking compensation module, the prediction module, positioning module, shaking compensation module, and vehicle sensors are connected with the data rendering module, connected with the projection display. The invention provides shaking compensation for automotive augmented reality systems.

6 Claims, 3 Drawing Sheets

(51) Int. Cl.
 B62D 15/02 (2006.01)
 G06V 20/56 (2022.01)
 G01S 19/42 (2010.01)
(52) U.S. Cl.
 CPC ..... *G01S 19/42* (2013.01); *G06T 2207/10016* (2013.01); *G06T 2207/30252* (2013.01)

(56) References Cited

U.S. PATENT DOCUMENTS

| | | |
|---|---|---|
| 2016/0216521 A1 | 7/2016 | Yachida et al. |
| 2018/0096501 A1 | 4/2018 | Anderson et al. |
| 2018/0322673 A1 | 11/2018 | Choi et al. |
| 2020/0241297 A1* | 7/2020 | Hatasako ................ H02K 7/06 |

FOREIGN PATENT DOCUMENTS

| | | | |
|---|---|---|---|
| JP | 2018-172088 A | | 11/2018 |
| KR | 20170054637 A | | 5/2017 |
| KR | 20170057511 A | * | 5/2017 |
| KR | 20170065082 A | | 6/2017 |
| KR | 20180003155 A | * | 1/2018 |
| WO | 2018/042898 A1 | | 3/2018 |
| WO | 2018/159119 A1 | | 9/2018 |

* cited by examiner

APPARATUS OF SHAKING COMPENSATION AND METHOD OF SHAKING COMPENSATION

CROSS-REFERENCE TO RELATED APPLICATIONS

This patent application in a Continuation-in-Part of U.S. patent application Ser. No. 17/268,786, filed Feb. 16, 2021, which is a National stage of the PCT application PCT/UA2019/000171 filed Dec. 12, 2019 which claims priority to Ukrainian patent application A 2019 02561 filed Mar. 15, 2019, all of which are incorporated herein by reference in their entirety.

FIELD OF THE INVENTION

This invention relates to vehicles, in particular to cars, and can be used to compensate and predict their shaking in order to display the augmented objects.

BACKGROUND OF THE INVENTION

A vehicle's windscreen display unit is known to create a virtual image in the driver's field of view inside the vehicle. The display unit contains emission unit to generate and emit an image signal, which is projected onto the windscreen in the driver's field of view. The driver perceives the projected image signal as a virtual image. The display unit contains at least one movable reflector affecting the projection path section. The virtual image representation is affected by the controlled movement of the emission unit and is additionally affected by changes in the signal of the emitted image relative to the image signal at the center position of the mirror. The movement of the emission block is performed depending on the recognized traffic situation [DE20151011616A1, 2017 Mar. 9].

The known unit is used to display virtual objects, providing the possibility to correct this display with two methods, without providing the mechanism of estimation and predicting the required corrections as such. Accordingly, the description of the device lacks the units required for the process under consideration and is itself a part of the described system with the required feature—the possibility of image compensation.

A display apparatus is known for a vehicle, in which the image sensor is designed to display at least one type of augmented object on the surface located in the vehicle. The display apparatus contains a compensation tool by which, depending on the movement of the vehicle, an image compensation mechanism is implemented for at least one type of displayed augmented object [DE102016009506A1•2017 Apr. 13].

The described apparatus does not contain a high-frequency shaking compensation unit and corresponding frequency separation mechanism to compensate. The absence of cascade connection of the apparatus units makes the cascade process of compensation impossible, said process is one of the key elements of the invention, allowing to use the method optimal in terms of frequency, latency and accuracy for compensation of shake components having different nature of appearance. Also, the connection of the units proposed in the known apparatus, does not allow an accurate assessment of time latencies that require a separate approach to compensation, in addition to the compensation of the spatial component for different frequencies. The method proposed in the well-known device suggests fixing the position of virtual objects immediately before the process of displaying, while the proposed method predicts low-frequency changes in the relative position of objects among themselves and relative to the objects of the real world, which allows to level out the latency arising in the display device (projection display).

The closest to the claimed invention is the display apparatus for a vehicle containing an image generator to display at least one type of augmented object on a surface located in the vehicle. At least one type of augmented object may be adjusted according to the movement of the vehicle with a compensating device designed to at least compensate for the vehicle's own motion. To this end, the compensating apparatus is connected to the recognition apparatus, by means of which at least the vehicle ego state can be detected, and the movement of the vehicle can be caused by the specified state. The compensating apparatus is designed to modify at least part of the information corresponding to one type of augmented object on the basis of the results received from the recognition apparatus [DE102015007518A1•2016 Feb. 25].

The well-known apparatus has two units—recognition device and a device for display of information with the possibility of compensation. The recognition device in a car has high values of latency from the signal receiving till the results of its recognition, which makes it impossible to use the said device for compensation the main effects that are the subjects of the proposed device. The absence of predictive units and high-frequency compensation also makes it impossible to obtain the results expected for the projection display.

The method of preparation of information about the environment near the vehicle is known, where real environmental objects near the vehicle are visually displayed, and these virtual objects are superimposed in the form of augmented reality with real objects. According to the current movement profile of the vehicle and/or movement profile of at least one real object near the vehicle, the time for virtual object displaying is determined [DE102016009506A1].

This method does not contain the last stage of the gyroscopic and accelerometer shake assessment, which has the highest frequency and accuracy and allows to achieve the described result and provide the frequency separation of such shakes for further compensation.

The said method describes the compensations associated with the motion of the vehicle and surrounding objects, taking into account the time latencies and prediction, however without the connection of said process with the last step of high-frequency compensation.

The method lacks the separation of obtained result into different frequencies. This is an essential part of the proposal, because it allows for optimal compensation based on testing and experiments that reveal which shaking elements need to be compensated and which only lead to a deterioration in perception and distraction of a driver.

The main sources of data latency are not identified, which leads to difficulties in the practical implementation of the system. Without them, it is also impossible to separate into different compensation frequencies, as they depend on the frequencies and latencies not only in receiving the data, but also in delivering thereof.

In the prototype method, the relative position of the displayed objects is determined at the minimum time before the display. Taking into account the time on the projection display, this approach introduces an additional latency of at least 20 ms for existing design technologies (DMD—digital micromirror device), even for low-frequency predicted movements of the car and surrounded objects, which are the main focus of the prototype.

SUMMARY OF THE INVENTION

The basis of the invention is the creation of an apparatus of shaking compensation for automotive augmented reality systems, which provides the complex correction of the position of the augmented objects, arising from the fact that the image on the display is perceived by the driver with zero latency, compensation for overcoming the hillocks or road bumps, compensation for various frequencies and amplitudes of the vehicle oscillations, which would make it possible to separate these oscillations from other vehicle oscillations, to distinguish their predicted portion, and to classify the remaining oscillations in order to compensate them optimally.

The second object of the invention, is the creation of the method of shaking compensation for automotive augmented reality systems, which is aimed at the complex correction of the position of the augmented objects, arising from the fact that the image on projection display is perceived by the driver with zero latency, while the data are delayed, as well as at compensation of various frequencies and amplitudes of the vehicle oscillations in order to separate these oscillations from the other vehicle displacements, and to separate their predictable portion.

The object set is solved by the fact that the apparatus of shaking compensation for automotive augmented reality systems, comprising a shaking compensation module, according to the invention comprises a recognition front facing camera, gyro sensor, accelerometer and vehicle sensors, connected with a prediction module, the gyro sensor, accelerometer and vehicle sensors are also connected with a positioning module (i.e., localization engine), and gyro sensor and accelerometer are also connected with the shaking compensation module, the prediction module, positioning module (localization engine), shaking compensation module and vehicle sensors are connected with a module of data rendering, which is connected with the projection display.

The object set is also solved by the fact that the apparatus of shaking compensation for automotive augmented reality systems, comprising shaking compensation module, according to the invention comprises a front facing camera, gyro sensor, accelerometer and vehicle sensors connected with a recognition module, the recognition module, gyro sensor, and accelerometer and vehicle sensors are connected with prediction module, the gyro sensor, accelerometer and vehicle sensors are also connected with a positioning module (localization engine), the gyro sensor and accelerometer are also connected with shaking compensation module, the prediction module, positioning module (localization engine), and shaking compensation module and vehicle sensors are connected with a module of data rendering, connected with the projection display.

The second object set is solved by the fact that in the method of shaking compensation for automotive augmented reality systems, according to which the compensations, associated with the motion of a vehicle and surrounding object, are described considering time latencies and prediction, according to the invention, the recognition results from front facing camera are transferred into the prediction module with corresponding frequency and latency in relation to the moment of light entering onto a matrix of the front facing camera, and the gyro sensor and accelerometer transfer data into prediction module and into positioning module, vehicle sensors transfer data with various frequencies and latencies into prediction module and into positioning module (localization engine), vehicle position and rotation are calculated by means of positioning module (localization engine), as well as their relative displacement for the time moment, remoted from current moment by cumulative time of module operation, and transfer them into prediction module, where based on the data received, the positions of static and dynamic objects are predicted separately, the data from gyro sensor and accelerometer enter into the vehicle shaking compensation module, where the prediction of shaking low-frequency is made over the period of operation of rendering and data display modules, and the rest of the shaking are given with the predicted portion into the module of data rendering for visualization on projection display, while calculations are made in the data rendering module, and the part of or all the portions are added, which were integrated over the period of operation of shaking compensation module, and correction of the image being formed to compensate the displacement of driver's eyes is applied after all corrections in the rendering module, the final result for the driver is visualized on projection display.

The second object set is also solved by the fact that in the method of shaking compensation for automotive augmented reality systems, according to which the compensations connected with the motion of a vehicle surrounding and objects are described, considering time latencies and prediction, according to the invention, a video stream from front facing camera is transferred into the recognition module, the gyro sensor and accelerometer and vehicle sensors transfer data into recognition module, where the surrounding objects are recognized based on data received, and results of recognition are transferred into prediction module, the gyro sensor and accelerometer transfer data into prediction module and into positioning module (localization engine), the vehicle sensors transfer data with various frequencies and latencies into prediction module and into positioning module (localization engine), vehicle position and rotation are calculated by means of positioning module (localization engine), as well as their relative displacement for the time moment, remoted from current moment by cumulative time of modules operation and transfer them into prediction module, where the positions of static and dynamic objects are predicted separately based on the data received, the data from gyro sensor and accelerometer enter into shaking compensation module of a vehicle, where the prediction of shaking low-frequency is made over the period of operation of rendering and data display modules, and the rest of the shaking are given with the predicted portion into the module of data rendering for visualization projection display, while calculations are made in the data rendering module and the part of or all the portions are added, which were integrated over the period of operation of the shaking compensation module, and correction of the image being formed to compensate the displacement of driver's eyes is applied after all corrections in the rendering module, the final result for the driver is visualized on projection display.

The cascade approach, built from lower frequencies data having longer latencies, but with better accuracy, to those that come more often and faster, but having the ability to accumulate errors over time, in modern cars, distinguishes the claimed apparatus from the prototype.

The apparatus uses all the data—both about ego-motion, and about the motion of static and dynamic objects, and from the high-frequency accelerometer and gyro sensor, and from the prediction module. Unlike well-known analogues, using no more than two of these mechanisms or using them without taking into account their interconnection, the proposed approach allows to obtain high-quality results, providing high requirements for apparatuses of that type:
- latency at level of the display system operation time;
- elimination the accumulation of errors in correction and prediction;
- use of data as soon as possible after their obtaining;
- efficient use of data at the maximum available frequencies;
- the possibility of various shaking compensation strategies for different shakes nature.

Effective compensation of high-frequency changes in the position and angle of a vehicle is inextricably linked with the compensation of its own motion and the movement of other objects at frequencies below this compensation, this connection is shown in the claimed invention, and the result achieved is due to the proposed cascade scheme of compensation from lower frequencies to higher ones.

Unlike the prototype, the inventive method allows to build optimal compensation based on testing and experiments that reveal which shaking elements need to be compensated, and which only lead to poor perception and distraction of the driver.

Compared with the prototype, where the relative position of the displayed objects is determined for the minimum time before the display, the claimed invention does not have this drawback, since the position determination takes into account the prediction with a time advance corresponding to the time of the physical display process, including additionally low-frequency shaking, too.

BRIEF DESCRIPTION OF THE DRAWINGS

The invention is illustrated by diagrams.

DETAILED DESCRIPTION OF THE PREFERRED EMBODIMENT

Figure 1:
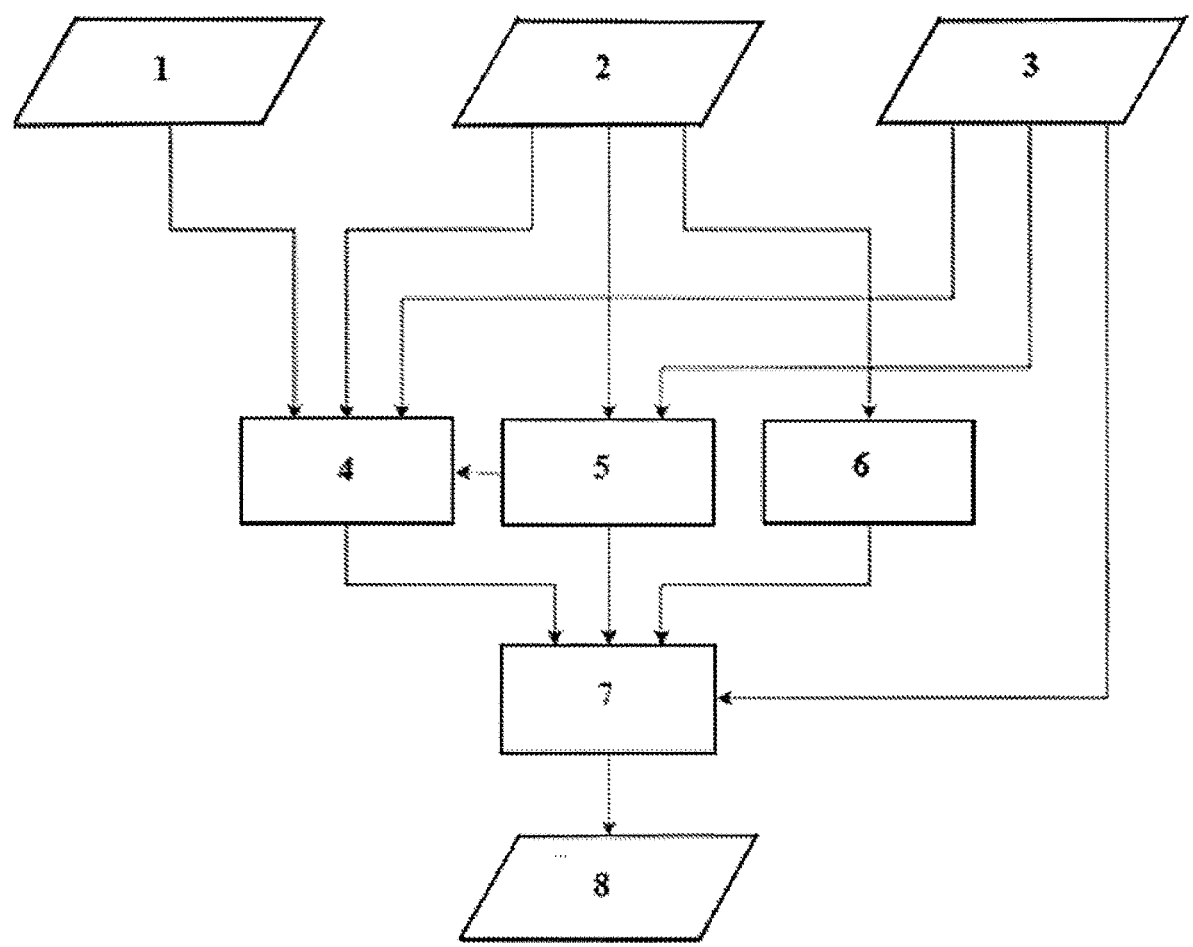
FIG. 1 illustrates the apparatus of shaking compensation of a vehicle, in which the camera provides recognized objects.
Figure 2:
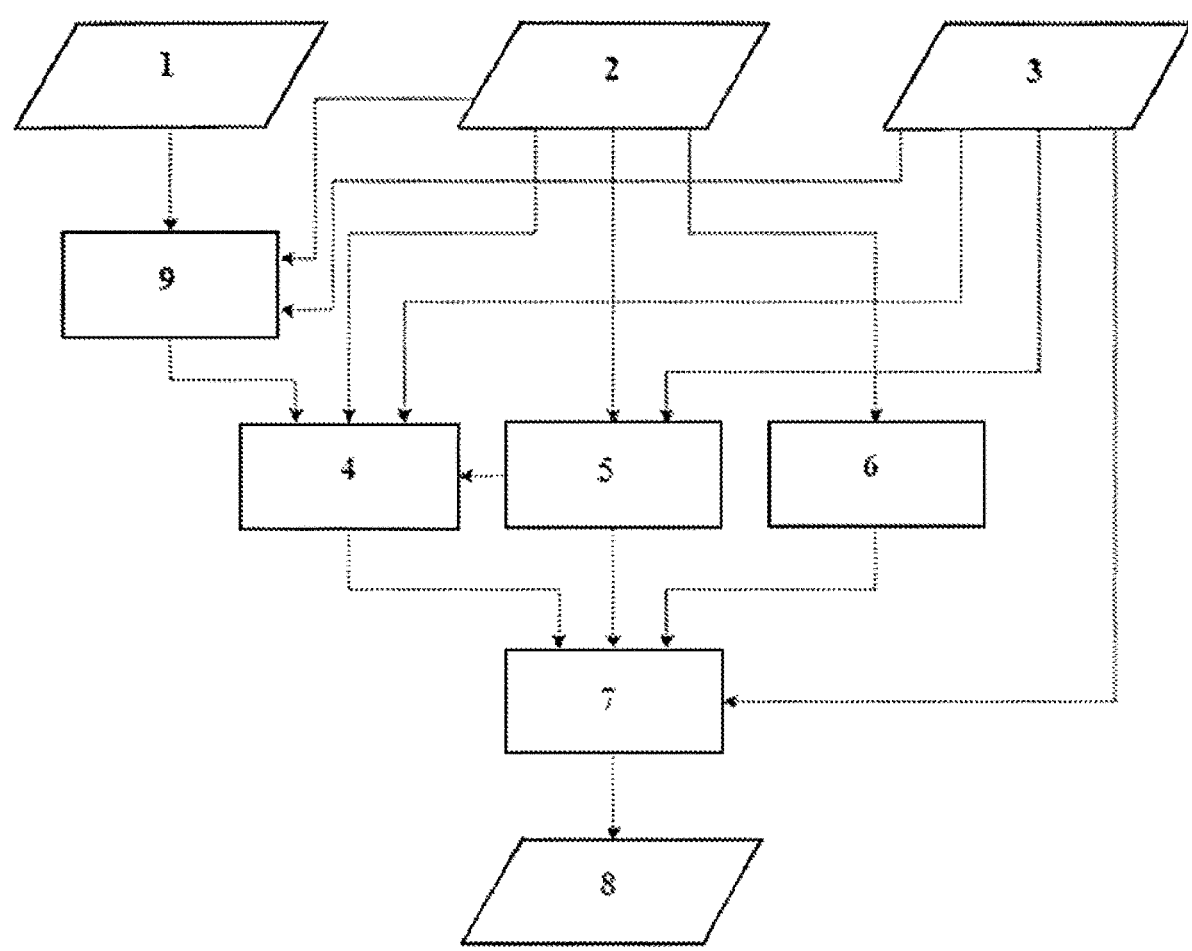
FIG. 2 illustrates the apparatus of shaking compensation of a vehicle, in which the camera provides a video stream.
Figure 3:
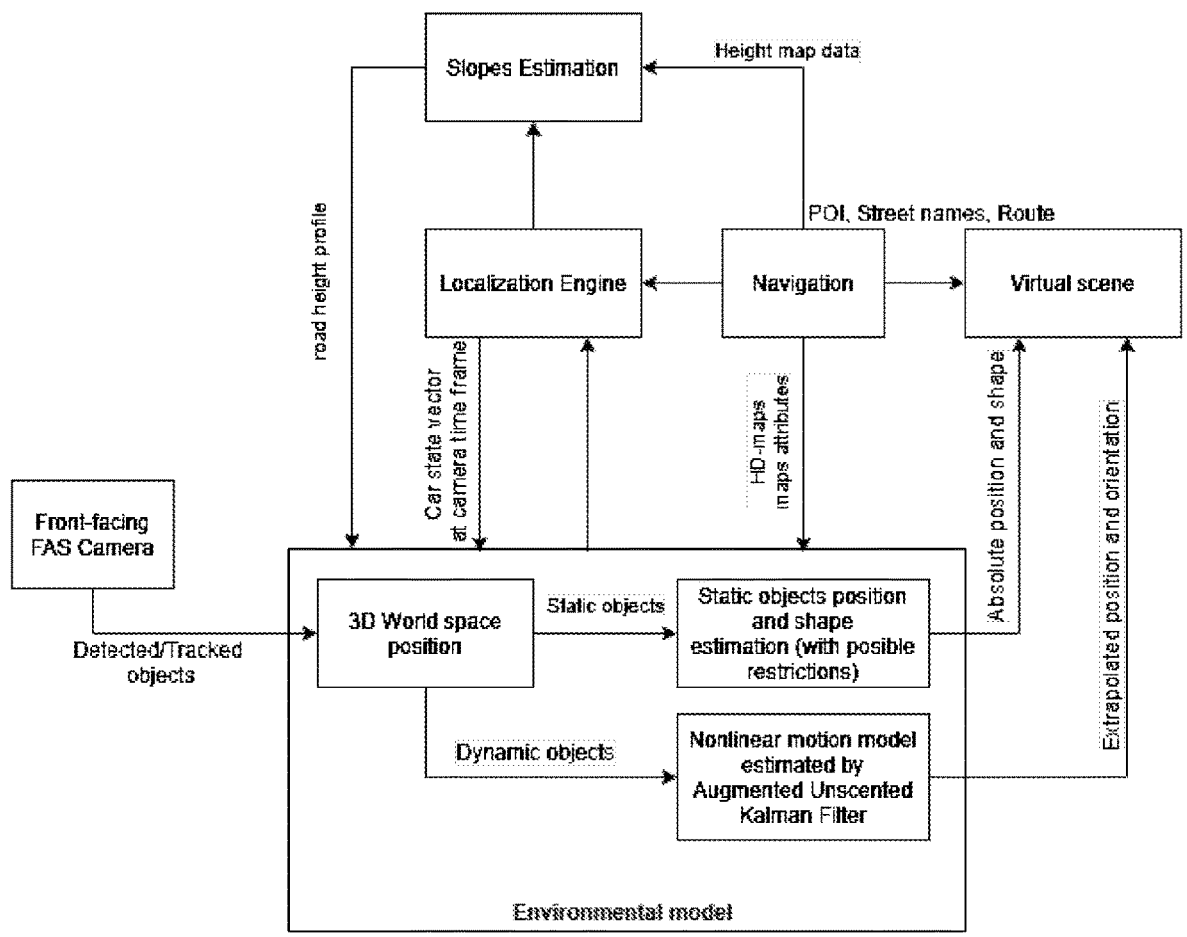
FIG. 3 illustrates critical elements of the system of the present invention and the method employed by the present invention.

Here The apparatus of shaking compensation of a vehicle according to the first embodiment comprises the recognition front facing camera 1, providing recognized objects, gyro sensor and accelerometer 2 and vehicle sensors 3, connected with the module 4 of prediction of own motion and movements of surrounding objects, which calculates relative displacement and absolute position of the vehicle, including rotation around three axes. The gyro sensor and accelerometer 2 and vehicle sensors 3 are also connected with the positioning module (localization engine) 5, and gyro sensor, accelerometer 2 are also connected with the shaking compensation module 6, operating based on gyro sensor and accelerometer measurement. The prediction module 4, positioning module (localization engine) 5, shaking compensation module 6 and vehicle sensors 3 are connected with the data rendering module 7 for display on projection display 8, with which it is connected.

The apparatus of shaking compensation of a vehicle according to the second embodiment comprises the front facing camera 1, providing a video stream, gyro sensor and accelerometer 2 and vehicle sensors 3 (at least a steering wheel rotation and vehicle speed), connected with the module 9 for recognition of own motion, surrounding dynamic objects and surrounding static objects by video stream. The recognition module 9, gyro sensor and accelerometer 2 and vehicle sensors 3 are connected with the prediction module 4. The gyro sensor and accelerometer 2 and vehicle sensors 3 are also connected with the recognition module 5, and gyro sensor and accelerometer 2 are also connected with the shaking compensation module 6. The prediction module 4, positioning module (localization engine) 5, shaking compensation module 6 and vehicle sensors 3 are connected with the data rendering module 7, connected with the projection display 8.

The apparatus of shaking compensation of a vehicle operates as follows.

In the first embodiment, the recognition front facing camera 1 transfers the recognition results into the prediction module 4 with a frequency of $F_1A$ and latency in relation to the moment of light entering onto a matrix of the front facing camera 1.

In the second embodiment, the front facing camera 1 transfers the video stream into the recognition module 9 with a frequency of $F_1B$ and latency in relation to the moment of light entering onto a matrix of the front facing camera 1. Gyro sensor and accelerometer 2 transfer data with a frequency of $F_2$ and latency into the recognition module 9. Sensors 3 of a vehicle transfer data with various frequencies and latencies to module 9. The recognition module 9, based on the data received, recognizes surrounding objects with the frequency of $F_1B$ and transfers the recognition results into the prediction module 4 with the frequency of $F_1B$ and latency in relation to the moment of light entering onto a matrix of the front facing camera 1.

Further, for both embodiments, the process is similar. Gyro sensor and accelerometer 2 transfer data into prediction module 4 with a frequency of $F_2$, and also into positioning module (localization engine) 5. The sensors 3 of a vehicle transfer data with various frequencies and latencies to prediction module 4, as well as to the positioning module (localization engine) 5. The positioning module (localization engine) 5 calculates the position of a vehicle and its relative displacement and transfers them to the prediction module 4 at required possibly changing frequency, $F_4$.

The positioning module (localization engine) 5 calculates the position and rotation of a vehicle and their relative displacement for the time moment, remoted from current moment by cumulative time of module operation 4, 7 and 8, and transfer them into data rendering module 7 with a frequency of $F_4$.

Based on the data received, prediction module 4 predicts separately the positions of static and dynamic objects, subtracting the latter from the model as the predicted nonrandom values of their movements and also higher frequency data from the gyro sensor and accelerometer 2, integrating them for the corresponding available time interval. The prediction occurs for the time moment, remoted from the time of results prediction by cumulative time of module 7 and 9 operation.

The shaking compensation module 6 of a vehicle receives the data from gyro sensor and accelerometer 2 and makes the prediction of low shaking frequencies for the operation of the module 7 of rendering and displaying data time interval, and the rest of the shaking are provided as additive portions corresponding to different frequencies, combined with the predicted part of portions, to the data rendering module 7 for display on projection display 8.

The data rendering module 7 performs the calculation, adds a part or all the portions, which were integrated over the period of operation of shaking compensation module 6.

Outside the scope of the current review, the correction of the image being formed to compensate the displacement of driver's eyes is applied after making all the corrections described in the module 7.

The final predicted positions of all the augmented objects estimated by means of described cascade manner for the data transfer and visualization of the projection display 8 time interval, and corrected, is rendered and transferred to the projection display 8, where it is displayed, allowing a driver to see the final result in the form of a virtual scene in front of the vehicle, which objects movements correspond to the movements of real objects in the driver's field of view due to the proposed system.

As introduced above and further explained hereinbelow, the following elements encompass the system, method, and apparatus of the present invention:

(1) A front-facing recognition camera is positioned on the vehicle, the camera providing a video stream and data related to objects captured (i.e., recognized) by the camera. Alternatively, a front-facing video camera providing video stream data only may be installed alongside a recognition module for similar functionality relating to object recognition. As an example, the Mobileye EyeQ chip family can be implemented as the recognition hardware which allows for such recognition functionality. The front-facing recognition camera shares the data captured with the various modules of the invention, e.g., via a vehicle network, such as CAN or Ethernet.

(2) A gyroscope and an accelerometer are provided as sensors on the vehicle, said gyroscope and accelerometer providing sensed data to various modules of the invention. Said sensed data allows for the system to determine, e.g., acceleration and changes in pitch and yaw angles, which are used in compensation. Additional de-noising and bias estimation technics may also be used to enhance the output quality of the data sensed.

(3) Various additional vehicle sensors (e.g., wheel sensors, steering wheel sensors, GPS, etc.) are also provided on the vehicle, said vehicle sensors providing sensed data as input to various modules of the invention, as described herein.

(4) A prediction module comprising a software component comprising an augmented unscented Kalman filter (or similar filtration algorithm) is used to predict the movement of the vehicle itself (i.e., own motion), the movement of static (i.e., fixed) objects surrounding the vehicle, and, separately, using a different filter, the movement of dynamic (i.e., moving) objects surrounding the vehicle. All movements are provided in absolute coordinates after prediction module operations are complete. The filtration algorithms are designed to output a required state of the ego vehicle in 6 dimensions (6-D)— specifically, 3-D rotation and 3-D transition. The filtration algorithm iterates for the required time (calculated as provided below), receiving data from the vehicle's Global Positioning System (e.g., longitude, latitude) and from additional vehicle sensors (e.g., wheel rotation speed, steering rotation speed, acceleration), without being provided with any new measurements or control inputs for each iteration. At the beginning of iteration, the actual filter's internal state and parameters are used. The time period for each iteration is calculated as a sum of operational time intervals. For example, each operational time interval might be measured simply as the time difference between when an operation began and when the operation completed.

The movement of the vehicle itself (i.e., own motion) is calculated/predicted using, e.g., wheel rotation speed and steering rotation speed inputs from vehicle sensors located on the wheels and the steering wheel, respectively. This movement of the vehicle itself is calculated also from an output of the localization engine discussed herein. The movement of objects is calculated/predicted separately for static objects and for dynamic objects. The predicted position of static objects surrounding the vehicle is calculated using an output from the localization engine and a maximum a posteriori (MAP) estimation, e.g., a least-squares estimation, of static object recognition results from the front-facing camera. I.e., the MAP estimation (or other filter) is applied to a series of positions of static objects relative to the vehicle, each of said positions being acquired via data/images captured by the front-facing camera.

To predict the movement of dynamic objects, the results of the movement of the vehicle itself are subtracted from the predicted positions of the dynamic objects. Thus, the movement of dynamic objects is predicted in the (global) coordinates system, linked to the road, subtracting the non-random ego vehicle movement. This subtraction of the known non-random portion of data reduces the deviation for dynamic object position predictions, significantly increasing the quality of such predictions (especially for windy, snake like driving, or for bumps in the road). Gyroscope and accelerometer data for the corresponding time interval is used to further compensate the non-random portion of ego-vehicle movements, caused by bumps and other sources of highly frequent pitch changes. The prediction occurs for a given time moment, remoted from the time of predicted results by a cumulative time of operation.

The prediction module provides critical enhancements over the current state of the art by utilizing data from an elastic steering model, thereby enabling the calculation/prediction of vehicle turns about 20 milliseconds faster (about 18-21 milliseconds faster, depending on the model used), and, in turn, making the prediction of the vehicle's own movements more precise. The elastic steering model is a physical model which evidences a delay between steering wheel rotation (i.e., intent of the movement) and actual turning of the vehicle's wheels (i.e., effect of the intent). In the present invention, and within the prediction module, the value of this delay is utilized. By knowing the wheel rotation from sensors located on the steering wheel, actual vehicle turns are predicted 20+ ms prior to those turns occurring via the wheels of the vehicle. The future position of vehicle is thereby predicted and further used for the rendering of objects in the virtual scene. Thus, when the physical process of data visualization is finished, objects are shown in more accurate positions within the virtual scene. Also, differentiation between moving and static objects, in combination with the 6-D position of the ego vehicle, enables more accurate prediction of the movement of both static and dynamic objects, after the subtraction/removal (based on comparison) of known, non-random ego vehicle movements, thereby predicting the movement of both static and dynamic objects in global coordinates.

The prediction module further comprises a localization engine (i.e., a positioning module), said localization engine comprising a software component for calculating vehicle positioning data. The localization engine calculates both the displacement of the vehicle and the absolute position of the vehicle in global coordinates. To calculate the displacement of the vehicle, the localization engine integrates input data regarding wheel revolutions from one or more wheel sensors and input regarding a steering wheel rotation angle from a steering wheel sensor. To calculate the absolute position of the vehicle, an augmented unscented Kalman filter is utilized, wherein each iteration of the algorithm receives input from the vehicle sensors, gyroscope, and accelerometer. Based on the displacement of the vehicle and the absolute position of the vehicle, the localization engine provides to the prediction module one or more vehicle state vectors for each camera time frame (i.e., each rendering iteration time period).

(5) Low shaking frequencies may also be predicted by the prediction module, such that such frequencies may also be compensated for in the virtual scene. The prediction of low shaking frequencies is performed, e.g., using a software component for calculating magnitudes of a Fourier transformation of those predicted angles corresponding to the low shaking frequency bands. After Fourier transformation, the coefficients for higher frequencies are set to zero, and then an inverse Fourier transform is performed. Such predicted low shaking frequencies may be provided as additional data to the prediction module to enable more accurate compensation for shaking occurring as a result of other environmental aspects.

(6) The prediction module further comprises a software component for the correction of the display formed, said correction compensating for the displacement of the driver's eyes. This correction may be performed, e.g., by projecting the 3D scene into a virtual pinhole camera, wherein the projecting center corresponds to the position of the eyes of the driver. Such projecting may be implemented, e.g., as software/code execution, launched via the graphical processing unit of the vehicle's SoC.

(7) A recognition module, comprising a software component, the vehicle's CPU/GPU, and the vehicle's System on Chip (SoC), may also be installed on the vehicle. This module is required particularly if only a front-facing video camera is used (i.e., without object recognition functionality). The recognition module may be used to calculate/estimate the vehicle's own movements, as well as surrounding dynamic (i.e., moving) and static (i.e., fixed) objects, wherein the calculations are based on video stream data. Utilizing this data, example calculations made by the recognition module might be based on convolutional neural networks (e.g., SSD (Single Shot Detector) architecture) and classical computer vision for tracking (e.g., ROI pooled correlation filter, Viola-Jones algorithm, etc.) in order to recognize/detect such objects in 3-D based on tracking results. Once calculated, the output/results of the recognition module are transmitted to the prediction module. The transmission of this data comprises a frequency of $F_1B$ as well as a latency value, the latency value being based on the moment at which light strikes a matrix of the front-facing camera. Resulting objects (from the recognition module) are potentially shared with other modules as well, all sharing being performed, e.g., via known inter-process communication interfaces, for instance, via a shared memory on the vehicle's SoC.

(8) A data rendering module receives the output of the operations of the prediction module and recognition module, the data rendering module then rendering this data, and correcting it, if necessary, to provide the input for a projected augmented reality display of the vehicle. Such rendering may be performed, e.g., using the known technology of Augmented Reality Head Up Displays (AR HUDs), such as digital micromirror devices (DMD) and digital light processors (DLP).

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. An automotive augmented reality display system, comprising:
    a front-facing recognition camera,
    a gyroscope,
    an accelerometer,
    a set of vehicle sensors,
    a vehicle System on Chip (SoC), including a CPU and/or GPU,
    a prediction module, said prediction module comprising:
        a localization engine comprising a first software component for calculating vehicle positioning data, said vehicle positioning data comprising a vehicle displacement and an absolute vehicle position in global coordinates,
        a second software component comprising a first filter providing for a prediction of a movement of static objects surrounding the vehicle, and a second filter providing for a prediction of a movement of dynamic objects surrounding the vehicle, said first and second filters iterating based on a time interval,
        a third software component for calculating magnitudes of a Fourier transformation of any angles corresponding to one or more low shaking frequency bands, and
        a fourth software component for correcting a virtual scene, said correcting compensating for the displacement of a vehicle driver's eyes, and
    a data rendering module, said data rendering module providing input for an augmented reality display, said input being based on rendered outputs from said prediction module.

2. An automotive augmented reality display system, comprising:
    a front-facing camera,
    a gyroscope,
    an accelerometer,
    a set of vehicle sensors, a vehicle System on Chip (SoC), including a CPU and/or GPU, a prediction module, said prediction module comprising:
- a localization engine comprising a first software component for calculating vehicle positioning data, said vehicle positioning data comprising a vehicle displacement and an absolute vehicle position in global coordinates,
- a second software component comprising a first filter providing for a prediction of a movement of static objects surrounding the vehicle, and a second filter providing for a prediction of a movement of dynamic objects surrounding the vehicle, said first and second filters iterating based on a time interval,
- a third software component for calculating magnitudes of a Fourier transformation of any angles corresponding to one or more low shaking frequency bands, and
- a fourth software component for correcting a virtual scene, said correcting compensating for the displacement of a vehicle driver's eyes, a recognition module, said recognition module comprising a fifth software component for estimating the movement of the vehicle, the movement of static objects surrounding the vehicle, and the movement of dynamic objects surrounding the vehicle, based on video stream data from said front-facing camera, and a data rendering module, said data rendering module providing input for an augmented reality display, said input being based on rendered outputs from said prediction module and said recognition module.

3. The system of claim 2, wherein said first software component provides a maximum a posteriori (MAP) estimation.

4. The system of claim 2, wherein said first filter is an unscented augmented Kalman filter.

5. The system of claim 2, wherein said second filter is an unscented augmented Kalman filter.

6. The system of claim 2, wherein the prediction module detects vehicle movements via a steering wheel sensor, said vehicle movements being predicted about 20 milliseconds prior to a movement of wheels of the vehicle.

* * * * *

UNITED STATES PATENT AND TRADEMARK OFFICE
CERTIFICATE OF CORRECTION

| | | |
|---|---|---|
| PATENT NO. | : 11,615,599 B2 | Page 1 of 1 |
| APPLICATION NO. | : 17/529532 | |
| DATED | : March 28, 2023 | |
| INVENTOR(S) | : Viktor Yuriyovych Sdobnikov | |

It is certified that error appears in the above-identified patent and that said Letters Patent is hereby corrected as shown below:

On the Title Page

Item (63) Related U.S. Application Data:
Please delete "Continuation-in-part of application No. 17/268,786, filed as application No. PCT/UA2019/000171 on Dec. 28, 2019, now abandoned." and insert --Continuation-in-part of application No. 17/268,786, filed on Feb. 16, 2021, now abandoned, which is a 371 of application No. PCT/UA2019/000171, filed on Dec. 28, 2019.--.

Signed and Sealed this
Sixteenth Day of May, 2023

Katherine Kelly Vidal
*Director of the United States Patent and Trademark Office*